US008848019B1

(12) United States Patent
Shane

(10) Patent No.: US 8,848,019 B1
(45) Date of Patent: Sep. 30, 2014

(54) SYSTEM AND METHOD FOR ENABLING VIRTUAL LIVE VIDEO

(71) Applicant: Terence Martin Shane, Toronto (CA)

(72) Inventor: Terence Martin Shane, Toronto (CA)

(73) Assignee: Refined Data Solutions, Inc., Richmond Hill, Ontario (CA)

( * ) Notice: Subject to any disclaimer, the term of this patent is extended or adjusted under 35 U.S.C. 154(b) by 0 days.

(21) Appl. No.: 13/842,719

(22) Filed: Mar. 15, 2013

(51) Int. Cl.
*H04N 7/15* (2006.01)

(52) U.S. Cl.
CPC ........................................ *H04N 7/15* (2013.01)
USPC ..................................... 348/14.05; 348/14.09

(58) Field of Classification Search
CPC ................................. H04N 7/15; H04N 7/152
USPC .......... 348/14.09, 14.08, 14.12, 14.05, 14.01; 370/260, 261
See application file for complete search history.

(56) References Cited

U.S. PATENT DOCUMENTS

2011/0279228 A1* 11/2011 Kumar ........................ 340/5.83
2013/0169742 A1* 7/2013 Wu et al. .................... 348/14.08

* cited by examiner

*Primary Examiner* — Stella Woo
(74) *Attorney, Agent, or Firm* — Galvin Patent Law LLC; Brian R. Galvin

(57) ABSTRACT

A system for enabling virtual live video, comprising a live video media server; a host computing device comprising at least a processor, a memory, a camera, a microphone, and a display; and a plurality of participant computing devices comprising at least a processor, a memory, a camera, a microphone, and a display. A host user establishes a session using the host computing device and a plurality of participants log in to the session each using one of the plurality of participant computing devices; at least some of the participants are selected for live video viewing by the host, whereupon the respective participant computing devices are directed by the host computing device to activate their cameras and microphones; and the host computing device subscribes to each of the activated cameras' video feeds and a plurality of participant video feeds is displayed in a grid on the host computing device.

8 Claims, 9 Drawing Sheets

SYSTEM AND METHOD FOR ENABLING VIRTUAL LIVE VIDEO

BACKGROUND OF THE INVENTION

1. Field of the Invention

The invention relates to the field of video conferencing, and more particularly to the field of virtual classroom video conferencing over a network data connection.

2. Discussion of the State of the Art

Video Conferencing has become an important component of virtual online learning. Universities, Colleges and Schools are increasingly using the Internet to deliver courses and curricula to geographically remote students while commercial and other types of organization are similarly using these tools to provide live, instructor-led training to employees, customers, distributors, volunteers etc. Web cams have become more generally available as built-in devices in laptop computers and tablets (plug-in units are also available for many computing devices at costs that are within reach of everyone), they can now be considered to be ubiquitous.

Similarly, technology is now widely available to make video web conferencing available to everyone using tools like Skype™ and Google Video™ Chat, through to sophisticated "virtual classrooms" using commercial products such as Adobe Connect, WebEx™, Elluminate™, GoToMeeting™, BigBlueButton™ and many others.

All of the tools mentioned allow users at their option to "share" their camera with others in the "virtual classroom" and some systems allow the technology to highlight or focus on the participants who have most recently been speaking. It is well known that between 60% and 90% of human communication is nonverbal and in a traditional physical classroom setting the teacher or trainer is able to "read" this information as they stand at the front of the class delivering the lesson. They are able to see which students are listening, confused, bored, engaged, distracted etc. and can call on one or more students based on this nonverbal feedback. Students in this environment should be focused entirely on the teacher and the class materials unless they are engaged in a discussion with the instructor or an interaction with other students. There are however, two major issues associated with the aforementioned tools related to virtual live, instructor-led classrooms.

As the number of video feeds being shared, rises, the number of simultaneous connections tends to rise exponentially. With two cameras publishing a feed and each user subscribing to the other's feed, there are a total of four connections. With three cameras, the virtual classroom needs to support nine concurrent feeds and with twenty cameras, the number of feeds rises to four hundred. Each user in a virtual classroom with N cameras is publishing a single feed and playing back N−1 feeds from the other cameras requiring the system to support $N^2$ feeds.

For online classes of 5 to 250+ students, the mathematics quickly result in an overwhelming amount of bandwidth and an overwhelming challenge for the students' computers to receive and render the incoming videos. As a consequence of this, previous attempts to deal with this issue tend to reduce the quality and frame-rate of the video streams with rising numbers of cameras but this rapidly eliminates the value of the live video as it transforms in to a series of poor quality still frames that update infrequently. Many technologies limit the number of simultaneous cameras to fewer than ten cameras for this reason and for those that do not have a physical limit, the practical limit is typically fewer than twenty feeds.

A second issue with increasing numbers of simultaneous video feeds is that the screen real-estate required to display the video images quickly reduces the amount of space available within the virtual classroom left to present class materials or for other elements such as chat, screen sharing, slide shows, documents, recorded video, whiteboards etc. While having multiple cameras visible to everyone in the virtual classroom makes sense for a small group chat scenario or to allow every student to see their peers, in many cases in an educational or training setting this is only a temporary requirement or can be distracting. From the teacher's perspective the need is quite different.

SUMMARY OF THE INVENTION

Accordingly, the inventor has conceived and reduced to practice, in a preferred embodiment of the invention, a system and method for enabling virtual live classroom video, which places lesser demands on network bandwidth and computer hardware than current video conferencing solutions.

According to a preferred embodiment of the invention, a system for enabling virtual live video is disclosed, comprising: a live video media server; a host computing device comprising at least a processor, a memory, a camera, a microphone or other audio input device such as a telephone, and a display; and a plurality of participant computing devices comprising at least a processor, a memory, a camera, a microphone or other audio input device such as a telephone, and a display. A host user establishes a session using the host computing device and a plurality of participants log in to the session each using one of the plurality of participant computing devices; at least some of the participants are selected for live video viewing by the host, whereupon the respective participant computing devices are directed by the host computing device to activate their cameras and microphones; and the host computing device subscribes to each of the activated cameras' video feeds and a plurality of participant video feeds is displayed in a grid on the host computing device.

According to another preferred embodiment of the invention, a method for enabling virtual live video is disclosed, comprising the steps of: (a) establishing, by a host user at a host computing device comprising at least a processor, a memory, a camera, a microphone or other audio input device such as a telephone, and a display, a session; (b) logging in a plurality of participants each associated with a participant computing devices comprising at least a processor, a memory, a camera, a microphone or other audio input device such as a telephone, and a display; (c) selecting at least some of the participants for live video viewing by the host; (d) directing the respective participant computing devices to activate their cameras and microphones or other audio input devices such as a telephones; (e) subscribing, at the host computing device, to each of the activated cameras' video feeds; and (f) displaying, via a live media video server, a plurality of participant video feeds in a grid on the host computing device.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
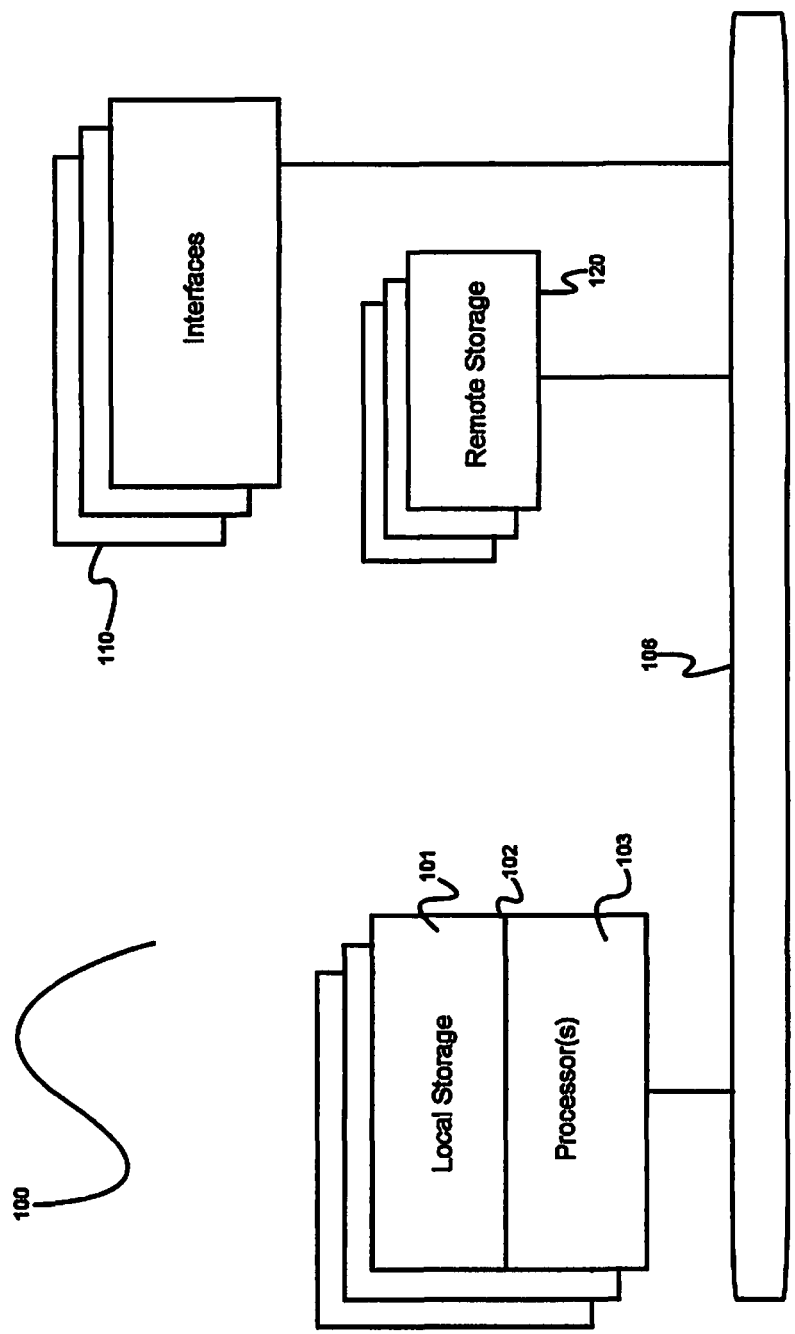
FIG. 1 is a block diagram illustrating an exemplary hardware architecture of a computing device used in an embodiment of the invention.

The inventor has conceived, and reduced to practice, a system and method for enabling virtual live classroom video.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "feed", as used herein, refers to any live or low-delay connection that streams or transmits data from one device to another for immediate viewing or use. For example, a "video feed" might refer to a connection between two devices, wherein a camera or similar video capture device on one device is capturing and immediately transmitting video data to a second device, which is viewing the video data as it is received, such as might give an impression of viewing events live, as they are unfolding in "real time".

A "host", as used herein, refers to a user that configures, initiates, or otherwise controls or creates a virtual live session. For example, in a virtual live classroom setting a "host" user might be the class instructor, teacher, teaching assistant, trainer, event manager, producer, subject matter expert or, in a business setting, a plurality of conference speakers might be "host" users. In this manner it should be appreciated that both single- and multi-host sessions may be configured as appropriate, according to the invention. "Hosts" may also be referred to herein as "instructors" or "teachers", as these are common exemplars of hosts according to the invention; when such terms are used, they should not be considered limiting but rather should be considered to apply to any hosts according to the invention.

A "participant", as used herein, refers to any of a number of users that might connect to a virtual live session initiated by a "host". An example would be students attending a virtual live class, guests at a conference presentation listening to a speaker, or employees attending a virtual live meeting, conference, or training session. Other examples might be live, virtual Continuing Professional Education courses required in numerous fields such as Accounting, Law, Medicine, Dentistry etc. "Participants" may also be referred to herein as "students" or "learners", as these are common exemplars of participants according to the invention; when such terms are used, they should not be considered as limiting but rather should be considered to apply to any participants according to the invention.

As used herein, a "learning management system" is an electronic system used to manage courses of instruction, and generally deal with such issues as registration of students, maintenance of student grades and profiles, and the like.

As used herein, a "virtual classroom" is an online venue that acts analogously to a traditional classroom; one or more instructors lead a class, usually but not necessarily using instructional materials such as slides, videos, sidebar articles, and the like. Virtual classrooms usually have means for immediate communication, often in the form of a group chat window for example.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
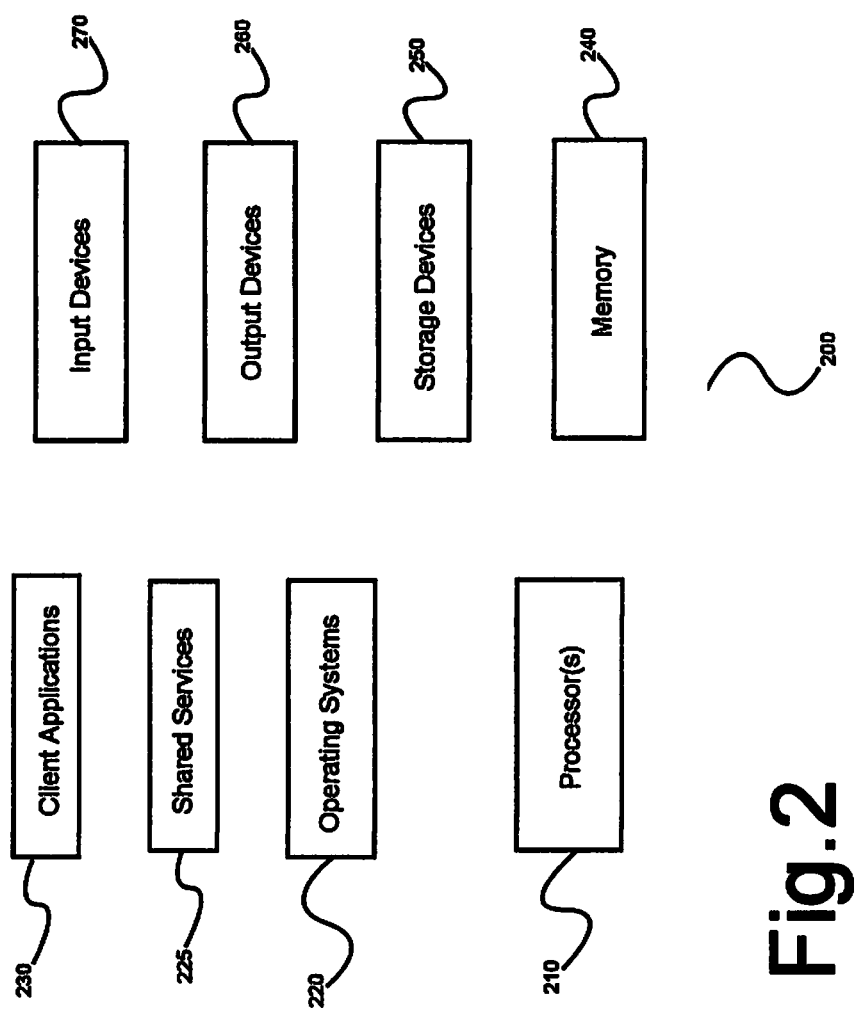
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. In some embodiments a telephone or other audio device may be used in lieu of a microphone for audio input by a user, according to the invention. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
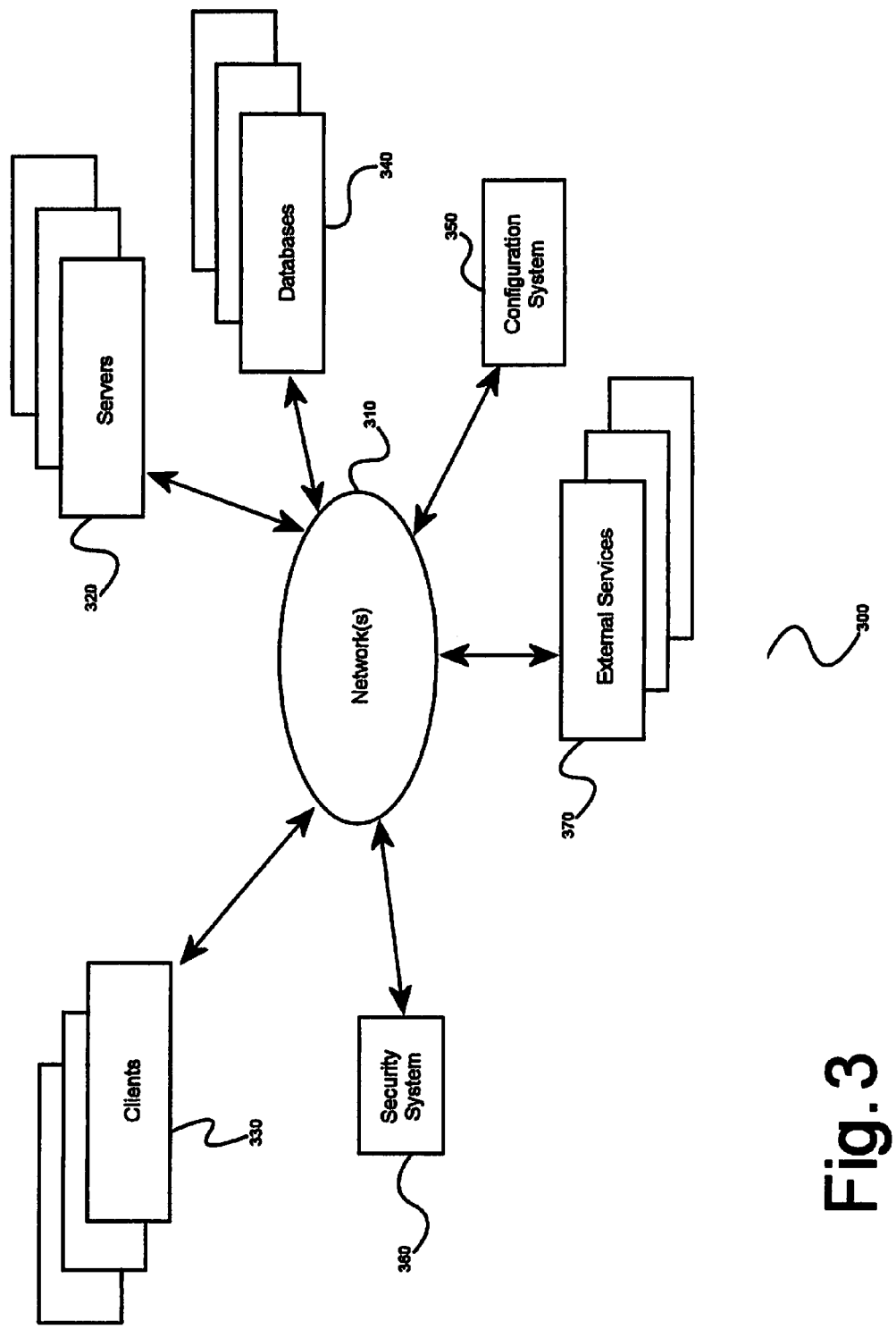
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
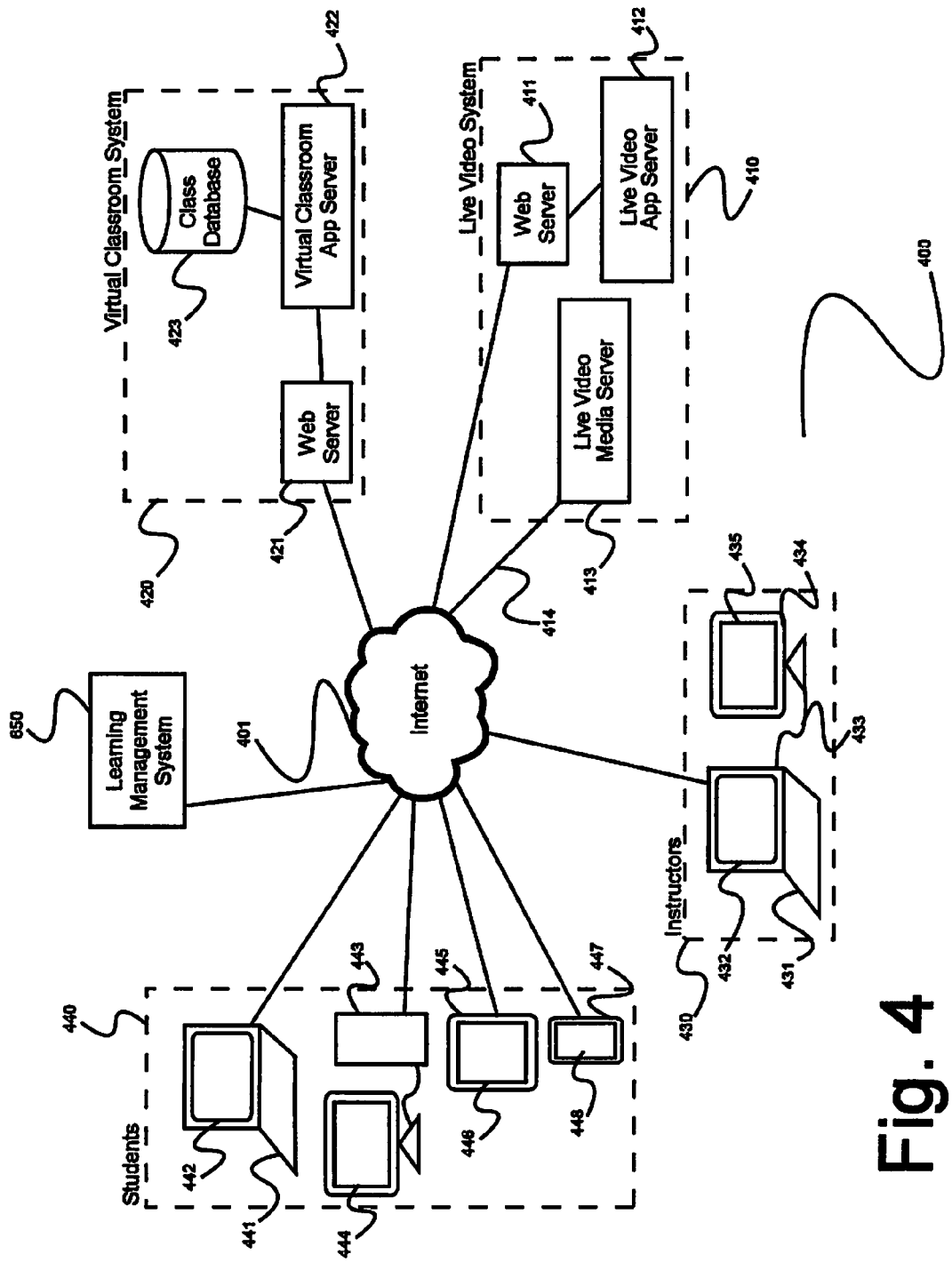
FIG. 4 is a block diagram illustrating an exemplary combined system architecture, according to a preferred embodiment of the invention.

FIG. 4 is a block diagram illustrating an exemplary combined system architecture 400 for virtual live classroom video, according to a preferred embodiment of the invention. As illustrated, existing virtual classroom technology 420 may be utilized according to the invention. Such technology 420 may comprise a web server 421 which may provide content for display in a web browser or for viewing in any of a variety of web-enabled software applications as are common in the art, and application server 422 which may operate web-enabled applications such as for providing classroom functions like test taking or asking questions during a lecture, and a virtual class database 423 which may store class information such as schedules, student information, grades, or any other information which might be associated with a classroom environment. It will be appreciated that the specific nature and implementation of such features may vary, such as utilizing a hardware storage medium such as magnetic or optical storage devices in place of a software-based database system for storing classroom data. It should be further appreciated that additional or alternate components may be utilized according to the invention, according to the specific nature and implementation of any particular virtual classroom technology 420 being utilized.

As illustrated, a live video system 410 may comprise a web server 411 which may present content for viewing such as on an electronic device via a web browser or web-enabled software application (as are common in the art), an application server 412 which may operate software applications such as for human interaction via a web browser or other software interacting with application content presented by web server 411, and a media server 413 which may present audio, photographic, video or other media for viewing, such as videos or audio tracks which may be suitable for a virtual classroom environment, or presentations or other media which may be suitable for a business environment, or any other such media which may be desirable for presentation. As illustrated, media server 413 may be connected via the Internet 401 or a similar data communication network, such that media may be presented in a variety of ways such as embedded within web content or presented directly upon request such as for downloading files, and it should be further appreciated that such a connection 414 as illustrated is exemplary and that alternate configurations are possible according to the invention, such as a direct physical connection (as is illustrated later, referring now to FIG. 5). It should be appreciated that in this manner, the system of the invention may be readily adapted for a wide variety of uses and not limited to a virtual classroom environment, however it is such a virtual classroom that is envisioned by the inventors as being the preferred use for such a system as envisioned. It should be further appreciated that alternate or additional elements may be utilized according to the invention, as may be appropriate according to a particular use case or implementation.

As further illustrated, a plurality of students 440 may connect via the Internet 401 or similar data communications network such as to interact with a virtual classroom system 410 such as for interaction with an instructor 430. Each student may interact via any suitable electronic device, such as a laptop personal computer 441 that may display a virtual classroom environment on an integrated video display 442, desktop personal computer 443 that may display a virtual classroom environment on a connected video display 444 (and it should be appreciated that multiple displays may be utilized according to the invention, as is common in the art), a tablet computing device 445 that may display a virtual classroom environment on a video display 446 such as via a web browser or a software application as is common in the art with such devices, or a mobile smartphone 447 that may display a virtual classroom environment on a video display 448 such as via a web browser or via a mobile software application as is common in the art with such devices. It should be appreciated that alternate or additional device technologies may be used according to the invention, and that alternative means of connecting devices via the Internet 401 or similar data communications networks may be developed and utilized according to the invention, and it should be further appreciated that by utilizing appropriate software or other means, a virtual classroom environment may be accessed or interacted with via any suitable device.

As further illustrated, an instructor 430 may connect to a virtual classroom system 420 such as for interaction with students 440. As illustrated, an instructor 430 may connect via the Internet 401 or similar data communications network, and may utilize any suitable electronic device such as (as illustrated) a laptop personal computer 431 (although of course other computing devices such as a desktop computer or a mobile computing device such as a tablet, could be used according to the invention as well as laptop 431; it should be appreciated that any appropriate device may be utilized according to the invention, and that only a laptop 431 is shown for brevity). As illustrated, a virtual classroom environment may be displayed within a browser 432, and a secondary or external display 434 may be connected via a video cable 433 or similar suitable means of communicating video data from electronic device 431 to display 434, and that external display 434 may be utilized to display a second browser 435 for presenting a plurality of student video feeds received from live video system 410, such as for example by showing live video feeds of multiple students 440 at once in browser 435 (as may be desirable for instructor 430 to monitor students 440 that are engaged, not paying attention, away from their computers, or any other activity which may be facilitated or enhanced by enabling instructor 430 to view a live video feed from a student's device). It should be appreciated that multiple instructors 430 may connect and participate according to the invention, and that only one such instructor 430 is shown for brevity. Furthermore, the arrangement just described is exemplary, and should not be taken as limiting in any way. Other arrangements are envisioned by the inventor; for example student video feeds may be viewed on a second monitor 434, or in a second window 435 on a monitor of device 431, or in a browser tab of browser 432 on device 431, if a second display device is unavailable. In these situations, the Host can alternate between views. Similarly, in another embodiment, second display 434 may be on an entirely separate second computing device. For example, the virtual classroom display 432 could be running on one computer while student video feeds are running on a tablet device with its own independent connection to the network.

As further illustrated, a live video system 410 may operate independently of other virtual classroom technologies 420, and may communicate with such technologies as well as instructors 430 or students 440 over the Internet 401 or similar electronic data communications network. In this manner, live video system 410 may be implemented as a components operating alongside existing virtual classroom technologies 420, providing only a live video feed component while existing technologies may provide other classroom features such as asking questions or performing activities such as homework assignments or exams. It should be further appreciated that such a combined approach as illustrated may be suitable for architectures other than a classroom setting, such as integrating a live video system 410 with other video-based collaboration or communication technologies, such as for group video communications within a business, wherein multiple employees might connect to a conference, each viewing a speaker while speaker may view multiple participants as described previously.

In some embodiments, learning management system 650 may interoperate with virtual classroom system 420 and live video system 412. It is well-established in the art that virtual classroom systems 420 interoperate regularly with learning management systems 650 (such as MOODLE™, Blackboard™, proprietary registrar systems, and the like). But in a novel step, live video system 410 may also interoperate with one or more learning management systems 650, for instance to prioritize student feed viewing or arrangement in browser 435 based on student grades, student attendance, student aptitude scores, and the like. Moreover, certain aspects of student performance may be measured by live video system 410, such as level of attentiveness or engagement, performance on "learning checks" or pop quizzes (which may be managed by live video system 410, as is described in detail below); in such cases, output from live video system 410 may be sent to and stored by learning management system 650.

In some embodiments, rather than using a separate browser 435 or a separate tab within a browser on device 431, viewing and management of participant live video feeds may be carried out by use of a plug-in or embedded application (or "app"). For example, some systems such as Adobe Connect™ that can be used for virtual classroom systems 420 may allow for embedded apps that are fully integrated, from a user interface point of view, within virtual classroom system 420 (feeds associated with such a plug-in app might, for example, be displayed within an instructor management screen of virtual classroom system 420 so that); in such cases, from an instructor's or host's point of view, only a single application is being used (the virtual classroom application), and the fact that display of multiple student or participant live video feeds is being carried out by a specialized application would be unknown and irrelevant to the host or instructor.

Figure 5:
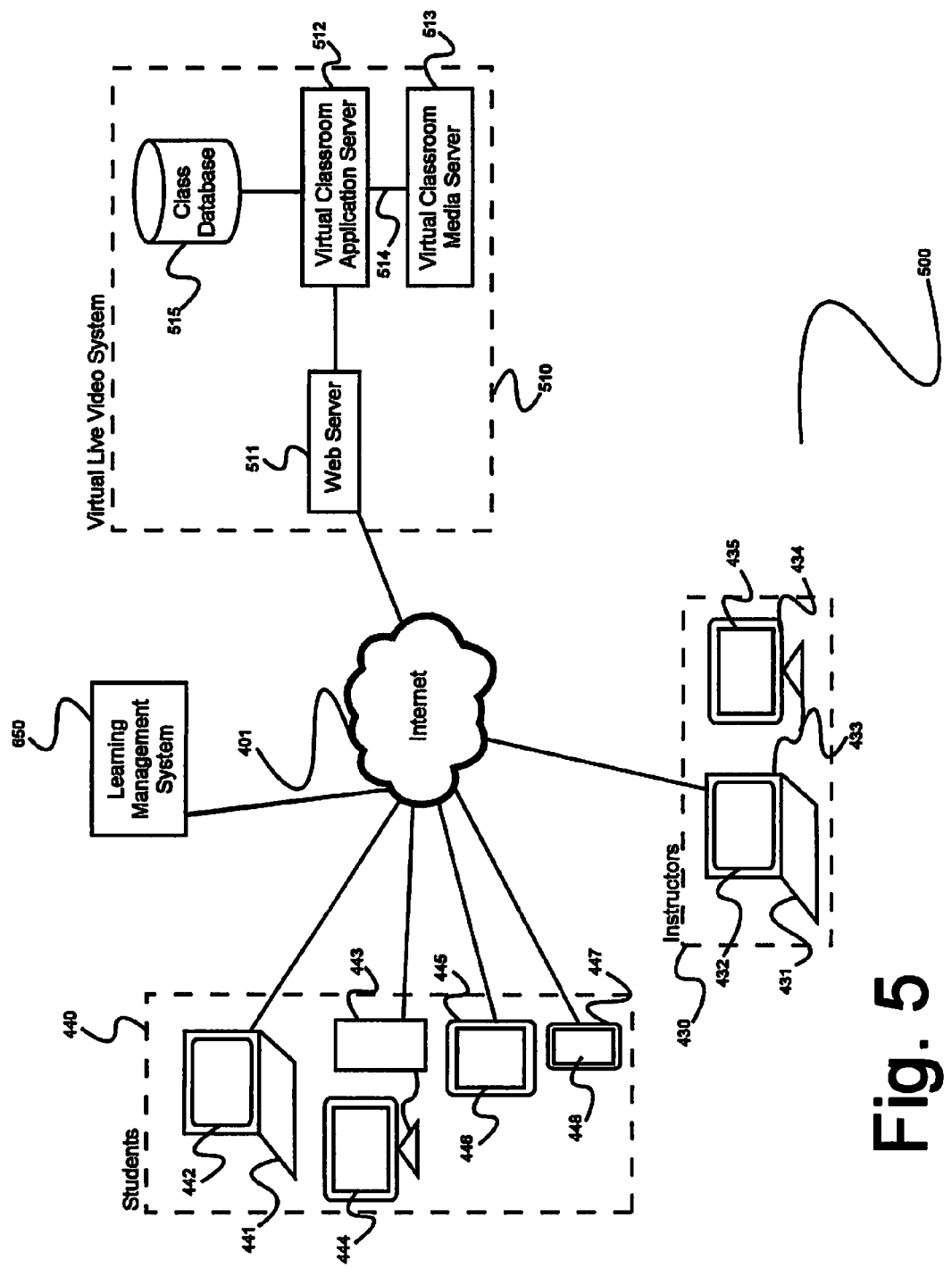
FIG. 5 is a block diagram illustrating and exemplary standalone architecture, according to a preferred embodiment of the invention.

FIG. 5 is a block diagram illustrating an exemplary standalone system architecture 500 for a virtual live video system, according to a preferred embodiment of the invention As illustrated, a virtual live video system 510 may comprise a web server 511 that may present content for viewing such as on an electronic device via a web browser or web-enabled software application (as are common in the art), an application server 512 that may operate software applications such as for human interaction via a web browser or other software interacting with application content presented by web server 511, and a media server 513 that may present audio, photographic, video or other media for viewing, such as videos or audio tracks which may be suitable for a virtual classroom environment or presentations or other media which may be suitable for a business environment, or any other such media which may be desirable for presentation, and which may also access, interact with, or control any audio or video components of devices, such as webcam and microphone components of a laptop personal computer 441, as may be desirable for activating or manipulating audio or video feeds as a part of a virtual live environment (such as an instructor activating the microphone of a student who wishes to ask a question). As illustrated, media server 513 may be connected to application server 512, and it should be appreciated that such a connection 514 may be of varied nature and construction, such as a direct connection via electronic cable, or a network connection as may be desirable for operating servers in separate physical locations. It should be further appreciated that such a direct connection 514 may be utilized as opposed to a connection via the Internet 401 or similar data communication network as illustrated previously (referring now to FIG. 4), as an application server 513 may be necessary to operate an application for a virtual live video environment that would present media from media server 514. It should thus be appreciated that a direct physical connection 514 is illustrated presently not as an only means of connection, but as an illustration of alternate means whereas a network connection 414 was illustrated previously (referring to FIG. 4). It should be appreciated that the system of the invention may be readily adapted for a wide variety of uses and not limited to a virtual classroom environment, however it is such a virtual classroom that is envisioned by the inventors as being the preferred use for such a system as envisioned. It should be further appreciated that alternate or additional elements may be utilized according to the invention, as may be appropriate according to a particular use case or implementation.

As further illustrated, a plurality of students 440 may connect via the Internet 401 or similar data communications network such as to interact with a virtual live video system 510 such as for interaction with an instructor 430. Each student may interact via any suitable electronic device, such as a laptop personal computer 441 that may display a virtual classroom environment on an integrated video display 442, desktop personal computer 443 that may display a virtual classroom environment on a connected video display 444 (and it should be appreciated that multiple displays may be utilized according to the invention, as is common in the art), a tablet computing device 445 that may display a virtual classroom environment on a video display 446 such as via a web browser or a software application as is common in the art with such devices, or a mobile smartphone 447 that may display a virtual classroom environment on a video display 448 such as via a web browser or via a mobile software application as is common in the art with such devices. It should be appreciated that alternate or additional device technologies may be used according to the invention, and that alternative means of connecting devices via the Internet 401 or similar data communications networks may be developed and utilized according to the invention, and it should be further appreciated that by utilizing appropriate software or other means, a virtual classroom environment may be accessed or interacted with via any suitable device.

As further illustrated, an instructor 430 may connect to a virtual classroom system 420 such as for interaction with students 440. As illustrated, an instructor 430 may connect via the Internet 401 or similar data communications network, and may utilize any suitable electronic device such as (as illustrated) a laptop personal computer 431. It should be appreciated that any appropriate device may be utilized according to the invention, and that only a laptop 431 is shown for brevity. As illustrated, a virtual classroom environment may be displayed on a video display 432, and a secondary or external display 434 may be connected via a video cable 433 or similar suitable means of communicating video data from an electronic device 431 to a display 434, and that external display 434 may be utilized to display output from a live video system 410, such as multiple students 440 being viewed on-screen at once (as may be desirable for instructor 430 to monitor students 440 that are engaged, not paying attention, away from their computers, or any other activity which may be facilitated or enhanced by enabling instructor 430 to view a live video feed from a student's device). It should be appreciated that multiple instructors 430 may connect and participate according to the invention, and that only one such instructor 430 is shown for brevity.

In this manner, system 500 may be implemented as a complete, standalone solution for viewing virtual live video feeds (such as an instructor 430 viewing feeds from students 440, as illustrated), and that system 500 may operate without additional components such as existing virtual classroom software as described previously (referring now to FIG. 4). It should be appreciated that such an arrangement may be desirable for a wide variety of uses, and that a virtual classroom environment as illustrated is exemplary and alternate configurations and uses are possible.

DETAILED DESCRIPTION OF EXEMPLARY EMBODIMENTS

Figure 6:
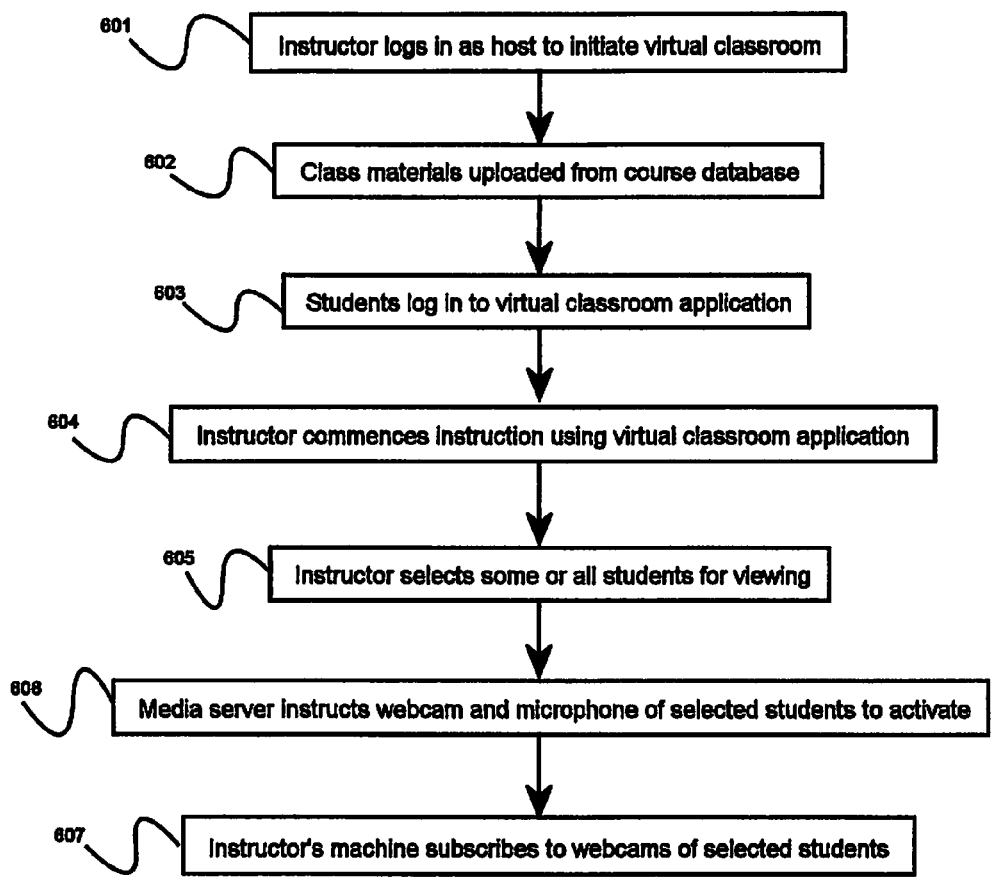
FIG. 6 is a method diagram, illustrating an exemplary method for setting up a virtual classroom, according to a preferred embodiment of the invention.

FIG. 6 is an illustration of an exemplary method 600 for configuration, setup, and basic operation of a virtual live classroom environment, according to a preferred embodiment of the invention. As illustrated, in a first step 601 an instructor may connect to a virtual live classroom system and log in as a host user. This may enable an instructor (or any user who logs in as a "host") to initiate a virtual live video session, to which other users may connect. In a next step 602, class materials may be updated from a class database (such as retrieving previous homework assignments or exams for review). Such an update may be an automated step such as a required function as part of initiating a classroom session, or may be manually or periodically performed (such as scheduling automated updates for specific dates or timeframes), and updates may be presented to a host as an option during initiation, such as a prompt asking if a host would like to perform an update, allowing the host to choose whether to get new material (as may be desirable, for example, if a host is simply initiating a session for a brief interaction, and does not want to spend time updating material that may not be required). It should be appreciated that a combination of update means may be utilized according to the invention, such as configuring an automated update once a week and allowing manual updates to be performed more frequently if desired, and it should be further appreciated that such updates may occur via a variety of means such as "fetch" in which new data is requested from a database or similar data storage, or "push" in which new data is sent by a storage service when updates are available, or any other means or combination thereof. Note that, in some embodiments or in some situations, instructors may use live video system 410 of the current invention without making simultaneous use of any course materials or dedicated content. For example, a teacher may host a seminar with a group of students to discuss a topic, without relying on any instructional materials. Thus it may be desirable in certain situations to conduct online sessions with only a live video system 410 and no virtual classroom 420 (and optionally without a learning management system 650 either, although operation with live video system 410 and learning management system 650, but without virtual classroom 620, is possible according to the invention, as for example when a seminar for which participation grades will be generated is conducted).

In a next step 603, a plurality of students may connect to a virtual live classroom such as via a web browser (for example, using a specific Internet URL shared by an instructor for classroom sessions), or via a web-enabled software application on an electronic device—for example, such as a mobile application for virtual live classroom session, which might (for example) allow a student to log in via any of a variety of traditional means (such as with a username and password), and may additionally allow a student to enter information to connect to a specific virtual classroom session or optionally search for one (such as entering a class ID number or an instructor ID to view available sessions). In this manner, a student may be enabled to easily find a classroom session via a variety of means as appropriate, or to quickly go to a specific known classroom session. It should be appreciated that a variety of implementations may be realized and be utilized according to the invention, and that the scenarios and procedures described above are exemplary and should not be construed as limiting in the features or functions of the invention in any way.

One important aspect of the instant invention is the maintenance of appropriate privacy safeguards. For example, it is usually not possible or at least not acceptable for a third party (e.g., an instructor) to turn on a student's webcam. Accordingly, in some embodiments, students may be requested to turn on their webcams when logging in, in step 603. In other embodiments, and more preferably, students may be requested to authorize the remote turning on of their webcams during class sessions by authorized instructors only (it will be assumed herein that microphones are controlled in a similar way, and usually in a single step, although of course independent webcam and microphone control by students or teachers is possible according to the invention, and alternate audio devices such as telephones may be used in place of microphones).

In a next step 604, an instructor may commence instruction within a virtual live classroom. Commencing instruction may optionally close a session to further connection attempts, effectively "closing the classroom door" in a virtual sense, by denying any new students to connect (potentially interfering with an instructor or disrupting instruction for students already present). Instruction may be commenced as a scheduled or automated function (such as allowing a set or configurable timeframe for students to connect to a session before commencing instruction), or it may be a manual operation performed by an instructor or other host user (such as an instructor waiting for all students to arrive, or a host waiting for a specific user such as may be desirable in other uses of a virtual live video system).

In a next step 605, an instructor may select a plurality of students for viewing, enabling their respective video feeds, if available. Such an action may be desirable for an instructor to monitor students during a class session, such as to ensure students are engaged and participating in a classroom environment rather than (for example) wandering away from a connected device or otherwise ignoring instruction. In this manner an instructor may monitor the status of their classroom and adjust their instruction as needed, or interact with specific students as needed to ensure maximum benefit from instruction—much in the same manner as a traditional classroom setting, wherein an instructor may stand in front of a student audience and interact with them directly. In some embodiments, instructors may receive a visual indication of whether a student has, or has not, authorized remote activation of her webcam (and/or microphone or other audio input device such as a telephone). Instructors may be allowed to reject students who refuse to make such an authorization; such an approach balances privacy with the educational goal of the instructor and institution—students who are unwilling to be monitored may elect to be educated elsewhere. This is analogous to a common situation in traditional classrooms: students who sleep in class or are disruptive, or who refuse to listen or participate, or who hide themselves, are routinely removed from classrooms in traditional educational venues, and the inventor envisions the same approach being available in systems according to the invention. In some embodiments, instructors may be provided with a "turn everyone on" button (or even a button that toggles between that and, "turn everyone off").

In a next step 606, a media server may access and manipulate selected students' cameras and microphones or other video or audio capture devices (if available). In this manner, an instructor may choose to select a student and remotely activate the student's video or audio feed, ensuring an instructor retains control over their classroom session. It should be appreciated that while it may be desirable for a student to maintain control over their device's audio or video feed, it would be counterproductive for a student to be able to deactivate such feeds and ignore instruction while potentially giving the impression of an active participant. However, a student may optionally be allowed to override their respective feeds either permanently or for a set or configurable time limit, such as to (for example) take a bathroom break and disable feeds for a certain duration before returning to instruction, or optionally allowing a set or configurable quantity of override actions (such as granting each student two 5-minute "breaks" per session). It should be appreciated that in this manner, multiple configurations may be utilized to provide a variety of options for control of a session, privacy or freedom of individual students, or other concerns. Such features or options may be optionally configurable by an instructor or host user when creating and configuring a session, as described previously (referring to an initial step 601), or may be predetermined as a part of a virtual live classroom application or service, or that a combination of preconfigured and configurable options may be implemented according to the invention, such as a virtual live classroom application that has default values for options such as timers for students to control their feeds, but allowing a host to override these predetermined values if desired. Such configuration options may also be storable and retrievable, allowing a host to set preferences and save them to economize future session initiations, such as by storing such configuration values in a database for retrieval as described above (referring to a second step 602).

In a final step 607, an instructor's device may "subscribe" to students' feeds (such as those selected and activated in previous steps), enabling the instructor to view, listen, or otherwise receive or interact with students' feeds. It should be appreciated that in this manner, a virtual live classroom will have been fully configured, students connected to participate in a virtual class, and an instructor given access to students' feeds to create a fully immersive classroom environment that will allow students to interact with an instructor as naturally as if they were interacting in person, and allowing an instructor to control and instruct a class as efficiently as if they were present in a traditional classroom before a body of students.

Figure 7:
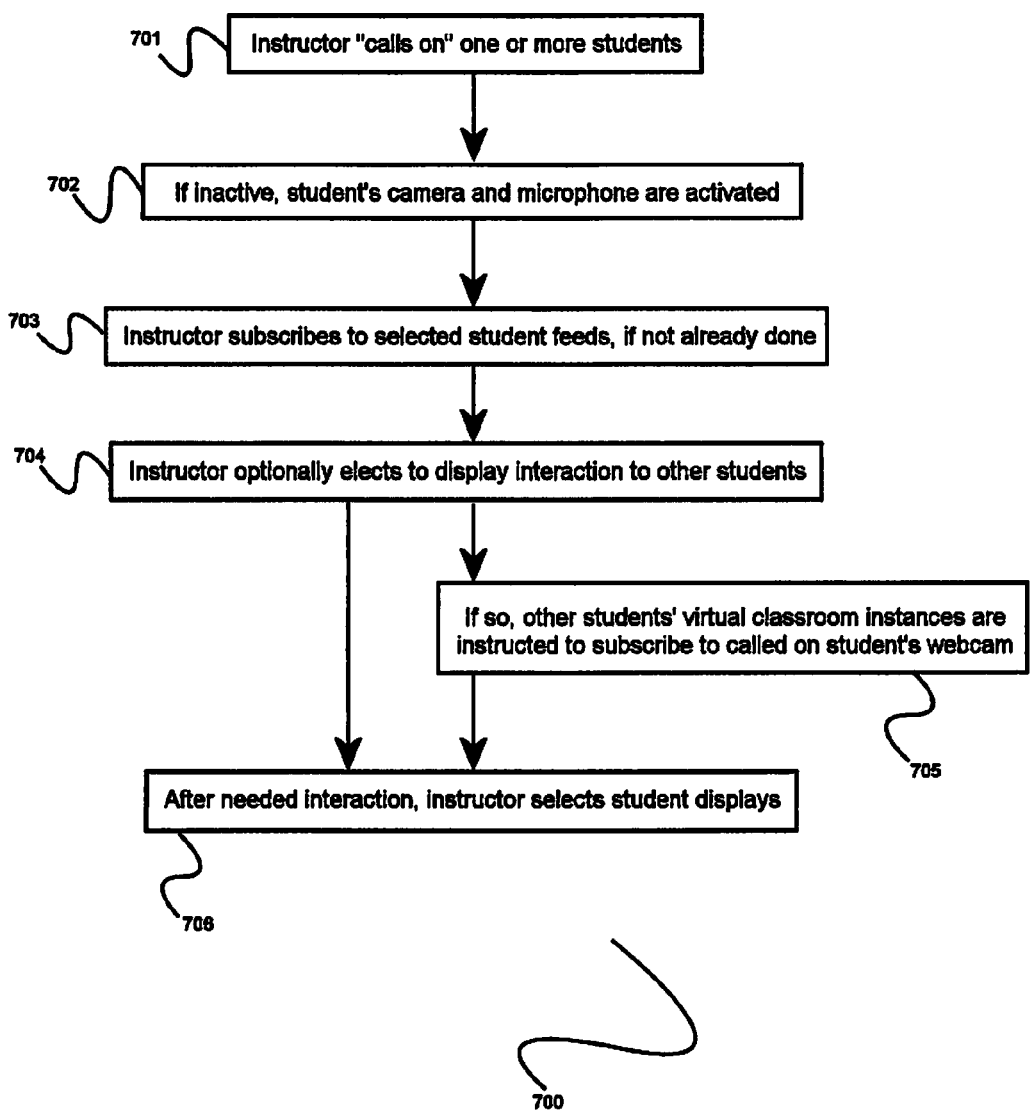
FIG. 7 is a method diagram, illustrating an exemplary method for calling on a student, according to an embodiment of the invention.

FIG. 7 is an illustration of an exemplary method 700 for an instructor to "call on" one or more students, according to an embodiment of the invention. In an initial step 701, an instructor may "call on" a student within a virtual live classroom session. An instructor may wish to call on a student for any of a number of reasons, including but not limited to asking a student a question and prompting a response, "pinging" or checking on a student to ensure participation, or providing a specific student with information such as (for example) telling a student that they have been excused from a class session or providing additional information to an earlier question or clarification. The act of calling on a student may trigger an alert such as sending a student a text or audio notification, or any other notification method which might effectively alert a student that an instructor is calling on them. In some embodiments, students may be automatically "called on" to perform tasks, by one of live video system 410, virtual classroom system 420, or learning management system 650. In such cases, a student may for example be issues a random challenge, that may "time out" and disappear, noting the failure of the student to respond if no response is received within a configurable period. Responses to such challenges, which may be used to one or many students, either periodically, randomly, or when some trigger has occurred (such as automated detection that a particular student or set of students is inattentive), may consist of requesting answers to challenge questions or of an evaluation of the lesson (e.g., "I'm confused", "I have some questions", "I'm getting it", etc.). This feedback may be used to filter student feeds by an instructor or host, or to highlight students who were confused in order to facilitate additional instructor attention to such students, or to collect metrics on the class over time to measure effectiveness of various portions of class materials.

In a next step 702, a student's camera and microphone (if present on their device) may be activated by the host if presently inactive. Such a function may be useful for such purposes as (for example) "checking in" on a student that has been inactive for a period, to ensure class participation, or to verify class attendance. It will be appreciated that such an ability may pose privacy concerns, and alternate configurations are possible according to the invention, such as allowing a student to deactivate a video feed and setup a text or other response should they be called upon (for example, a student might turn off their device's camera and setup a text response to notify an instructor of the reason for the deactivation). As described previously (referring to FIG. 6), such behaviors might be predefined or configurable by either a host or student in a number of ways, and a variety of implementations and combinations thereof are possible according to the invention.

In a next step 703, an instructor may subscribe to a student's video, audio, or other data feeds, if they are not already. In this manner, after calling on a student and activating their device's camera or microphone (or any other component that might capture and/or transmit data, such as an accelerometer or magnetometer as may be appropriate according to a specific use or implementation of a virtual live classroom session), an instructor may then begin to view available feeds from the student's device, allowing them to monitor classroom participants. As described previously, such behavior may be predefined or configurable, and a number of variations may be utilized according to the invention.

In a next step 704, an instructor may choose whether to further present data from the called upon student's feeds (if any) to other classroom participants. Such behavior might be desirable, for example, if an instructor calls upon a student to provide a demonstration, or if a student has information which may be useful to other students and the professor wishes to make it available. In this manner, one student's feeds may be presented to a plurality of additional students, in addition to the instructor themselves.

In an optional step 705, additional students' devices may be instructed to subscribe to a called upon student's feeds, allowing an instructor to actively force students' devices to view a called upon student's data to ensure exposure. In this manner, an instructor might call upon a student to share information with the rest of the class, and override other students' devices to subscribe to the called upon student's feeds so that the students may benefit from the information even if they (for example) do not know how to subscribe to feeds manually or are otherwise unable to do so (such as performing another task occupying their hands, for example in a laboratory setting where students might be engaged in manual activities relevant to a class while listening to instruction).

In a final step 706, when an interaction between an instructor and a called upon student has concluded, instructor may then choose to revert back to an overview of multiple students, whatever viewing configuration has been chosen as the default, or whatever configuration was in use immediately prior to calling upon the student for interaction. It should be appreciated that such configurations may be predefined (such as having options for "view all students", "view selected students", "view first five students", or other quickly-selectable redefined values), or they may be configurable (such as, as described previously with reference to FIG. 6, allowing an instructor to configure preferences or retrieve previously-saved preferences during session initiation). In this manner, an instructor may be interacting with a body of students as a whole, choose to call on one or more students for specific interaction, optionally share such an interaction with rest of the class, then return to instruction quickly and conveniently so as not to disrupt the classroom or flow of instruction.

It should be appreciated that the methods and behaviors described above may be adapted to any number of students or other users being called upon, and that when a single student is described it is purely exemplary and such description is intended only for purposes of brevity and clarity of intent.

Figure 8:
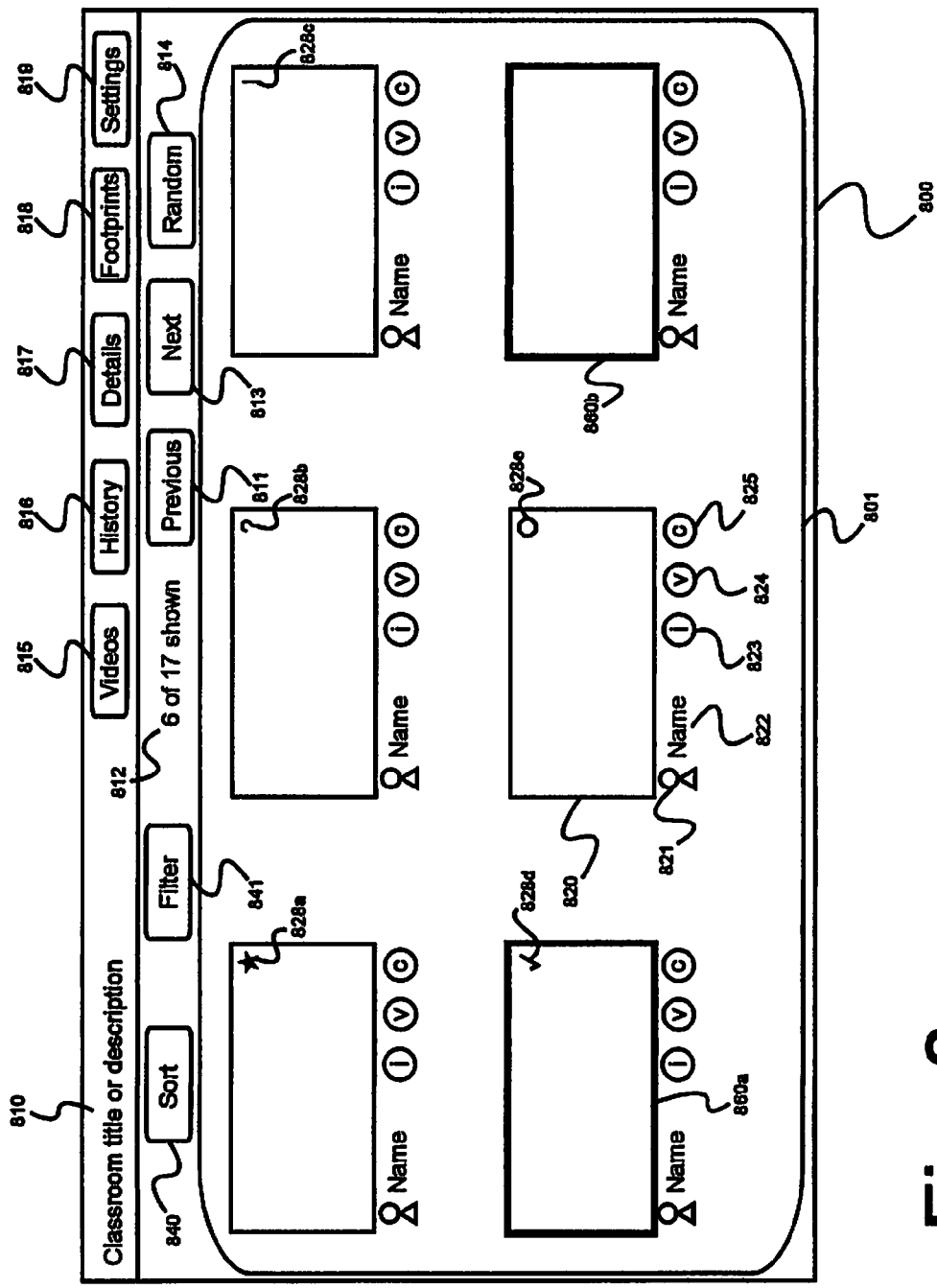
FIG. 8 is an illustration of an exemplary instructor user interface for viewing video feeds from learners, according to an embodiment of the invention.

FIG. 8 is an illustration of an exemplary user interface 800, illustrating a number of virtual live video feeds as may be utilized in a virtual live classroom or similar virtual environment, according to an embodiment of the invention. As illustrated, an interface 800 may comprise a main screen 801 in which feeds 820 may be displayed, classroom information such as a class name or session description 810, and a variety of controls for an instructor or other host user. For example, a Videos button 815 may be provided to allow an instructor to instantly navigate from any other screen to a screen such as that shown in FIG. 8, where a plurality of video feeds 820 is displayed in frame 801. Similarly, a Previous button 811 may be provided to allow an instructor to move to a previous set of student video feeds in frame 801, while a Next button 813 would do the same for a next set (which might be determined by a sorting or filtering that had been previously performed). A Random button 814 may be provided, to allow an instructor (particularly of a large class) to cause a random selection of available student video feeds 820 to be displayed in frame 801. A display status element 812 may be provided for large classes, to indicate which set of video feeds is being displayed (e.g., number 6 of 17 sets). A History button 816 may enable display of historical session information such as notes taken, students called on, metrics of comprehension measures by live video system 410, information regarding student access (such as when students logged in or out, when feeds were activated, deactivated, subscribed to, or otherwise manipulated, or any other potentially-relevant information), or any relevant historical information regarding a session, a course, or a student or set of students. A Footprints button 818 may be provided, which allows an instructor to select some or all students and the view detailed technology footprint information for those students. Information in a footprint may include, but is not limited to, such things as Internet Protocol (IP) address, geographic location, device type (laptop, desktop, tablet, smartphone, etc.), operating system, browser, available bandwidth to the student's computing device, and so forth. Such information may be helpful to an instructor in assisting a student who is having difficulty with technical aspects of a session, or for understanding the context within which a student is viewing the materials provided. A Settings button may 819 be provided to allow an instructor to view and/or edit various settings that are used in delivering instruction according to the invention. Many settings may be accessible via Settings button 819, but some typical examples may include how many video feeds to show in frame 801, how often to rotate the set of feeds shown in frame 801 (when automated rotation is selected, which of course can be another setting; automated rotation would occur without use of a Next button 813 or a Previous button 811), how often (and how) to challenge students randomly to gauge attentiveness and comprehension, and so forth. It should be appreciated that a wide range of viewing and session management settings may be viewed and edited via Settings button 819; the examples given are merely exemplary. A Details button 817 may be provided, to allow detailed data presentation regarding for example a selected student; for example, by selecting a student and clicking Details 817, and instructor may be presented with a popup or with a new screen that presents detailed student information. Such information may comprise, but is not limited to, student age, aptitude test scores, grade history in the current and possibly in previous courses, field of study, and previous instructor notes. A plurality of displayed live video feeds 820 with associated information or controls may be presented in interface 800 to allow an instructor to view real-time video of all or a portion of students attending an online session. It should be appreciated that the arrangement, quantity, and nature of elements illustrated is exemplary and that alternate or additional elements or components may be utilized according to the invention. It should be appreciated that such user interface elements described herein are exemplary, and that alternate or additional elements may be incorporated with alternate functions, such as (for example) a clickable button element that allows a host to view a set of concurrent virtual live sessions that satisfy certain parameters (such as other sessions for the same class ID, or within the same department). In this manner it should be appreciated that a wide variety of functions or information may be incorporated into interface 800 according to the invention, and that any elements illustrated and described are purely exemplary.

While selection of feeds 820 for display in frame 801 may be controlled by an instructor by, for example, pinning a particular feed to keep it visible as others are rotated out of view (see below), it is envisioned that various user interface elements may assist an instructor in manipulating the selection of feeds 820 that are visible at any given time. To this end, for example, Filter button 841 and Sort button 840 may be provided. Filter button 841 may cause a selection box to pop up, within which an instructor may specify certain filtering conditions. Generally, only those students who satisfy specified filtering conditions would have their video feeds 820 displayed (or eligible to be displayed) in frame 801. Examples of filtering conditions might include, but are not limited to, filtering only students with low (or high) grades; filtering students who have not interacted within virtual classroom 820 within a specified period of time; filtering students who have language challenges; and so forth. It should be readily apparent that a wide variety of filtering conditions may be used according to the invention to select students for live video viewing. Sort button 840 may be used for conventional sorting operations on a list of eligible (to be viewed) students. For example, students that could have their video feeds viewed may be sorted by class rank, by current grade, by age, by standardized aptitude test scores, by principal language, and so forth.

As illustrated, interface 800 may display a number of live video feeds 820 from student devices. A feed 820 may be presented for viewing along with relevant information or control elements, such as a student's name or other identification information 822, clickable or otherwise interactive elements for such administrative functions as viewing a student's detailed personal information 821, viewing a student's class information 823 (such as grades, attendance records, or any other information that might be relevant to a class instructor), activating, deactivating, or subscribing to a student's video feed 824, or calling upon a student 825 as described previously. In this manner, each feed may be presented with a variety of relevant information and interactive controls to access other information or functions relevant to a specific feed. It should be appreciated that such elements may be grouped with their respective feeds, such that when a feed is displayed on-screen any associated information or control elements are displayed as well, and when a feed is no longer displayed (such as, for example, when an instructor chooses to view the next feed using a button 813 described above) any associated elements are similarly removed from display. In some embodiments, some students may have a colored heavy frame 860a-b surrounding their video feed. Such a technique adds emphasis to those feeds, and could be used to highlight students at risk of failing (for instance, with a heavy red frame), students known to be strong academically and both willing and able to help less capable students (for instance, with a heavy gold frame), and so forth. In another method of conveying student-related information visually to assist instructors, icons 828a-e may be displayed in association with live video feeds of some or all students. Icons 828a-e could be used to indicate many student attributes visually. For example, star icon 828a might indicate a student with exceptional academic potential (or one who is exceptional at helping others through mentoring etc.); question mark icon 828b might be displayed when a student has indicated he has a question to ask; exclamation point icon 828c could be used to indicate a student that requires attention because some threshold or alarm condition has been met (for example, no motion in 60 seconds, suggesting either the loss of the video feed or a student who has stepped away); a check icon 828d could be used to indicate that a student has completed a task; a red circle or stop sign icon 828e could indicate a student who has requested that the instructor pause for a moment. It should be evident that many different static of dynamic student attributes or conditions can easily be displayed using icons 828a-e associated with student video feeds, and that these examples are exemplary and not limiting.

It should be appreciated that the arrangements, methods, and behaviors described above are exemplary, and are described as operating according to an exemplary functional premise of a classroom environment wherein an instructor is interacting with a plurality of students. It should be further appreciated that such a premise is exemplary, and the arrangements, methods, and behaviors described above may be readily adapted for use according to a wide variety of premises, such as (for example) a business conference wherein a speaker may give presentations to a plurality of employees or guests, or (as a further example) a convention panel wherein a plurality of speakers may interact with an audience in a virtual interview setting. It should be appreciated that in this manner, the invention may be readily adaptable to any arrangement or function wherein a plurality of users may desire to interact via a virtual social gathering, using live video, audio, or other data feeds to facilitate or enhance such interaction.

Figure 9:
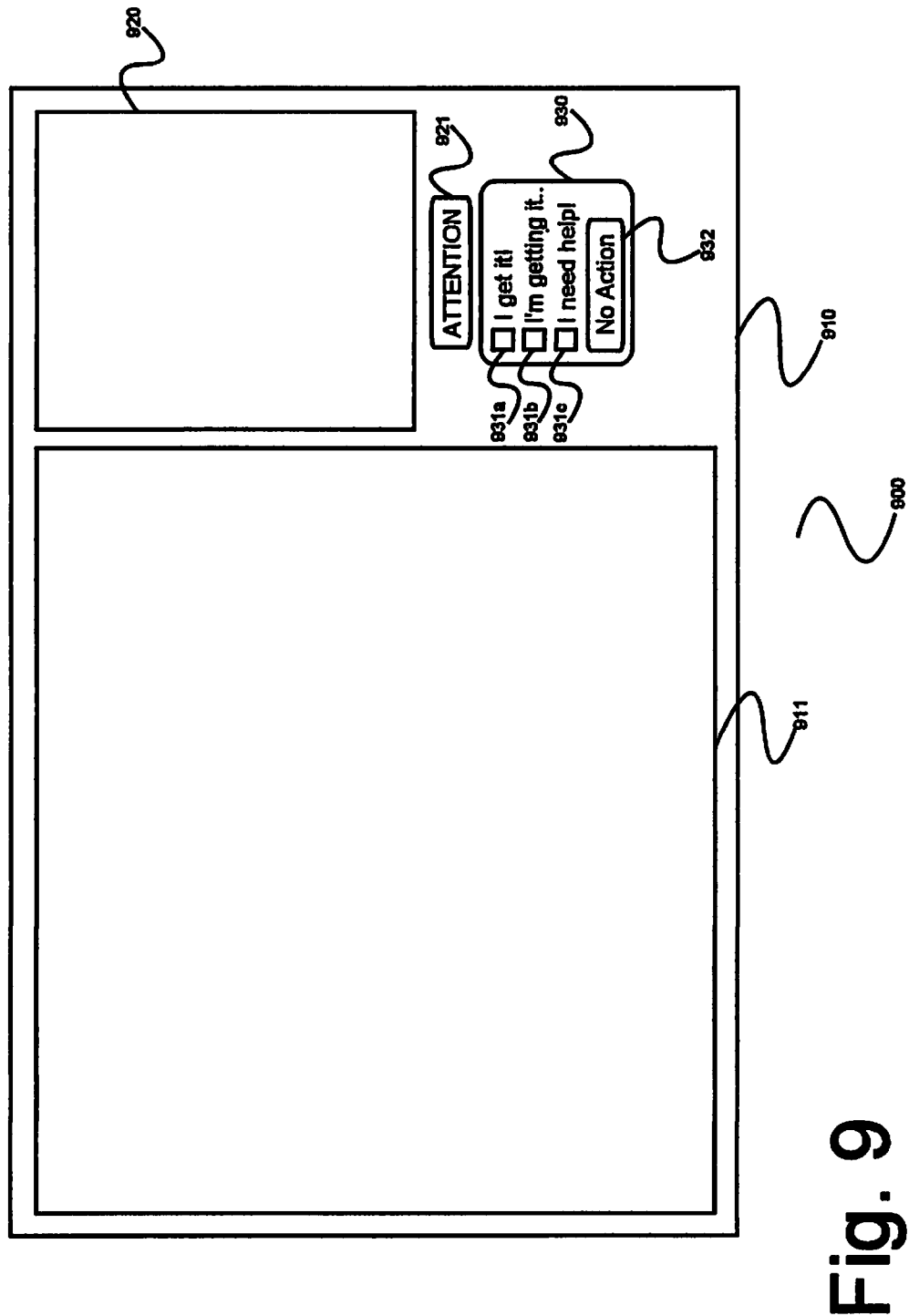
FIG. 9 is an illustration of an exemplary learner user interface according to an embodiment of the invention.

FIG. 9 is an illustration of an exemplary learner user interface 900 according to an embodiment of the invention. According to the embodiment, various interaction elements are provided to assist participants (students) in making best use of a virtual classroom 820 augmented by a live video system 810. Interface 900 is typically presented within or via a web browser 910, and may comprise a large frame 911 for educational or course materials (typically managed and presented by virtual classroom 420), within which most instructor teaching occurs (although, as noted above, in some embodiments no course frame 911 may be used, as during an open format seminar among several participants and at least one instructor or leader). Video frame 920 may be made visible whenever an instructor is presenting her webcam video feed to students, or when other students are connected as a result of an instructor's selecting more than one student to interact (for example, to discuss a particular question among themselves). An Attention button 921 could be made available, either continuously or occasionally, or subject to certain constraints. On activating Attention button 921, a student may be presented with a dialog box presenting options, such as "please pause", "I have a question", "I am stepping away but will return", and so forth. In effect, the Attention button 921 provides a flexible, open-ended means for student-initiated communication with an instructor, the communication commonly being provided to the relevant instructor by placement of an icon 828 over the requesting student's feed, or by displaying an alert in an appropriate user interface element (such as a side bar, a chat box, or the like). Popup 930 may be made visible when challenges are made to test students' attentiveness, comprehension, and the like. For instance, popup 930 could appear when an instructor explicitly requests it, or when a trigger is met (more than a certain percentage of students inactive, for instance), randomly, or on a predetermined schedule. Typically, popup 930 is different than normal pop quizzes, which stop the flow of instruction and allow time for students to consider responses and enter them. With challenges via popup 930 (or presented via other means), instruction may or may not continue; further, challenges often will be made with predefined timeout settings, such that, if a student does not respond within the timeout, they will be counted as unresponsive. Popups may comprise, checkbox-style elements, from which one may be selected (of course, multiple selections could be allowed if desired). For examples, selection 931a can be selected by a student to quickly say, "I get it!"; selection 931b to say, "I'm getting it . . . "; and selection 931c to say, "I need help!". Obviously any number of other choices, including factual selections such as "Which President signed the Emancipation Proclamation?", may be used in popup 930 according to the invention. In some embodiments, a No Action button 932 may be provided so that students who do not wish to select any of available selections 931 may press the No Action button 932 to at least show that they are online and aware of the popup (this would be useful, for example, during professional education such as Continuing Legal Education, when it is often important to verify that professionals not only were logged in but were paying attention during a session in order for them to get professional credit).

The skilled person will be aware of a range of possible modifications of the various embodiments described above. For example, in an alternative embodiment an instructor could select several students' feeds, and then set up a side group, and then repeat, so that in effect a class may be divided, for a time, into a number of small groups, each of which shares video feeds among its students but with students in other groups. Such a capability would greatly facilitate small group breakouts during larger classes. Another area envisioned by the inventor is analytics based on data generated by interactions among and between students, instructors, and the various systems described above. For example, automatic inactivity detection could be performed by noting video feeds that exhibit levels of motion below some threshold. Scores of challenges can be used as raw data; as a result, trends within a session ("Which parts of the session were effective, and which were confusing to most students?"), or between sessions ("Do daytime sessions work better than evening sessions?" or "Which students are losing traction over the time frame of this course, indicating a need for more follow-up?"), or even between courses ("Which instructors are best suited for online teaching?" or "How effectively does online teaching accommodate students with language challenges?"). It will be appreciated that the amount and type of data generated by an interactive virtual classroom with rich use of video feeds will have many uses, according to the invention. Accordingly, the present invention is defined by the claims and their equivalents.

What is claimed is:

1. A system for enabling an online classroom with virtual live video, comprising:
  a live video media server stored and operating on a network-attached computer;
  a network-connected host computing device comprising at least a processor, a memory, a camera, a microphone or other audio input device such as a telephone, and a display; and
  a plurality of network-connected participant computing devices each comprising at least a processor, a memory, a camera, a microphone or other audio input device such as a telephone, and a display;
  wherein a host user establishes a session using the host computing device and a plurality of participants log in to the session each using one of the plurality of participant computing devices;
  further wherein at least some of the participants are selected for live video viewing by the host, whereupon the respective participant computing devices are caused to send live video over the Internet to the live video media server and microphones or other audio input devices such as a telephone;
  whereupon each participant computing device receives live video from the host instructor computing machine via the live video media server, the live video comprising video content captured by the camera of the host computing machine;
  wherein the host computer, upon receiving a request to call on a first participant not currently sending live audio, sends a message to the first participant's computing device directing it to commence sending the first participant's live video and audio to a plurality of other participants via the live video media server; and
  wherein the host computing device subscribes to a plurality of participant cameras' video feeds and a plurality of participant video feeds is displayed in a grid on the host computing device.

2. The system of claim 1, wherein the host computing device is only able to select for viewing participant computing devices whose corresponding participants have expressly granted permission to the host to do so.

3. The system of claim 2, wherein those participant computing machines whose participants have expressly denied permission for the host to view them are prevented by the host computing machine from logging in to the session.

4. The system of claim 1, wherein each participant computing machine comprises a virtual classroom software application adapted to receive instructional content and/or an instructor video feed from the host computing machine via the Internet.

5. The system of claim 4, wherein the virtual classroom software application further comprises a plurality of participant video feed frames adapted to allow groups of participants to interact visually in a virtual classroom setting.

6. The system of claim 1, wherein a second participant computing machine further comprises a user interface element adapted to enable a second participant to request assistance or attention from a host, thereby causing the second computing machine to activate its camera and microphone if not already activated and to send a message to the host computing machine requesting the host computing machine to subscribe to its video feed.

7. A method for enabling virtual live video is disclosed, comprising the steps of:
   (a) establishing, by a host user at a host computing device comprising at least a processor, a memory, a camera, a microphone or other audio input device such as a telephone, and a display, a session;
   (b) logging in a plurality of participants each associated with a participant computing devices comprising at least a processor, a memory, a camera, a microphone or other audio input device such as a telephone, and a display;
   (c) selecting at least some of the participants for live video viewing by the host;
   (d) causing the respective participant computing devices to commence sending live video and audio to a live video media server stored and executing on a network-connected computer and microphones or other audio input devices such as a telephones;
   (e) subscribing, at the host computing device, to each of the activated cameras' video feeds;
   (f) sending live video from the host computing machine comprising video content captured by the camera of the host computing machine to each of the participant computing devices;
   (g) upon receiving a request to call on a first participant not currently sending live audio, sending from the host computing device a message to the first participant's computing device directing it to commence sending the first participant's live video and audio to a plurality of other participants via the live video media server; and
   (f) displaying, via the live media video server, a plurality of participant video feeds in a grid on the host computing device.

8. The method of claim 7, wherein the other audio input device is a telephone.

* * * * *